Oct. 25, 1938.   D. LEVINSON   2,134,487
EXPANSIBLE DOOR FOR AUTOMOBILES
Filed July 9, 1937
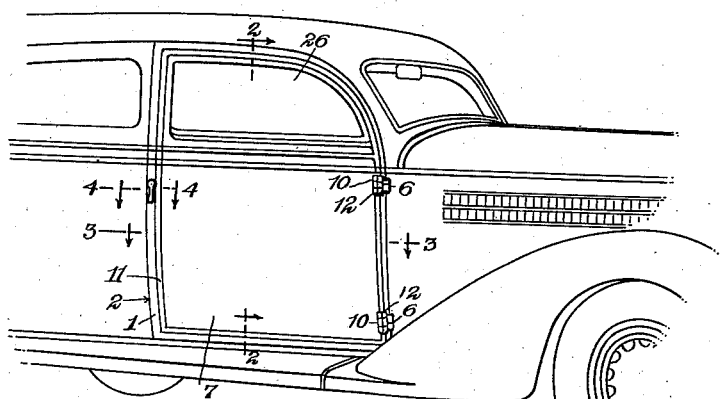
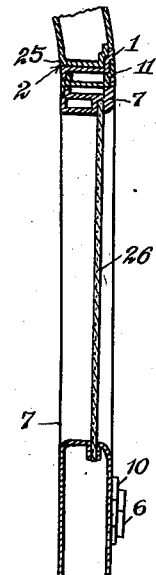
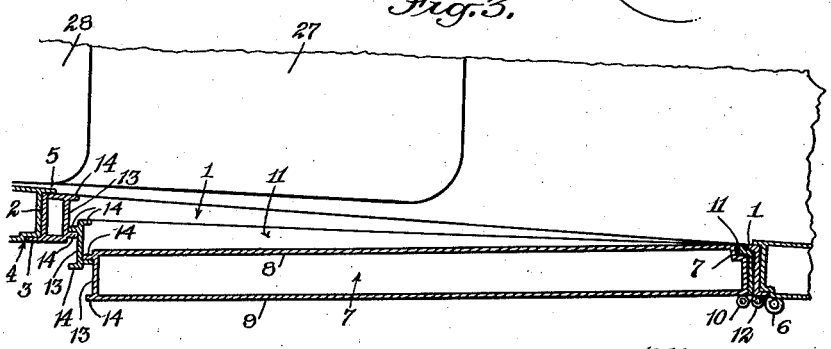
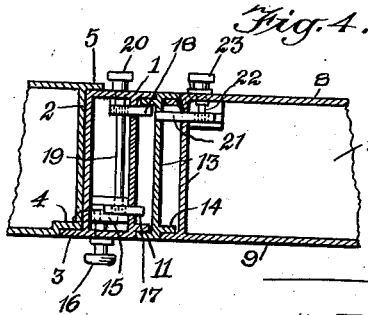
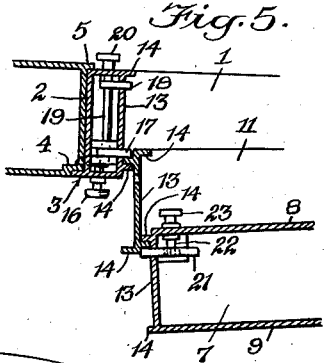
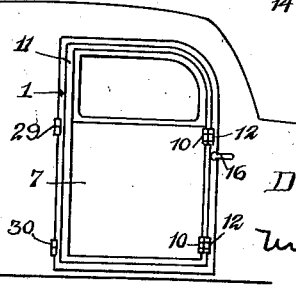
WITNESSES
INVENTOR
David Levinson
BY
ATTORNEYS Patented Oct. 25, 1938

2,134,487

UNITED STATES PATENT OFFICE 2,134,487

EXPANSIBLE DOOR FOR AUTOMOBILES

David Levinson, Brooklyn, N. Y.

Application July 9, 1937, Serial No. 152,774

2 Claims. (Cl. 296—44)

The present invention has for its object to provide additional space transversely extending in the area adjacent one of the seats of an automobile as, for example, the front seat in a four-door sedan or the main seat of two-door sedans and roadsters, thus to accommodate comfortably the driver of the car and two passengers on a seat intended normally for two persons only.

To the above ends the present invention may be said to consist of an expansible door for automobiles provided with a panel substantially coextensive in area with the door in which the panel is mounted, and to provide means whereby the panel may be moved outwardly from a position wholly within the plane of the door to a position outside of the plane and so constructed that while permitting a limited movement of the panel a substantially weatherproof connection between the door and panel will be at all times maintained.

The invention further consists of a hinged door provided with a hinged panel permanently connected therein for a swinging movement at an angle to the plane of the door and independently of the door so as to expand transversely the normal space between the doors on opposite sides of an automobile when such doors are closed.

The present invention is shown in the accompanying drawing in which—

Fig. 1 shows in perspective the intermediate portion of a well-known type of automobile equipped with my improved expansible door;

Fig. 2 shows a vertical section taken on the line 2—2 in Fig. 1 looking in the direction of the arrows;

Fig. 3 is a horizontal sectional view on the line 3—3 in Fig. 1 with the door expanded;

Fig. 4 shows a horizontal cross section taken on the line 4—4 in Fig. 1 looking in the direction of the arrows;

Fig. 5 is a horizontal cross section similar to Fig. 4 with the door expanded;

Fig. 6 is a side elevation showing a modified form in which the door is hinged along the opposite edge as compared to Fig. 1.

Similar reference characters will be employed to designate corresponding parts.

The door consists of a frame I which corresponds in size and shape to that of the door opening 2 in the body of the car. The door frame I is provided with a flange 3 which when the door is closed will be seated in the rabbeted portion 4 surrounding the door opening when the door is in engagement with a flange 5 at the inner edge of the door opening, all as usual in automobiles. The door frame I is hinged to one edge of the door opening 2 in the car body by the hinges 6 so that it may be swung open and closed in the usual manner. A panel section 7 somewhat smaller than the door frame I is carried by the door frame and is so constructed that it may be moved into and out of the plane of the door frame and the car body as indicated in Figs. 3 and 5. The panel 7 is formed with double walls 8 and 9 and is hinged at 10 to swing into and out of the plane of the door frame I and the body of the car as shown. Between the door frame I and the panel 7 is a coupling frame II fitting into the door frame I and about the edge of the panel 7. The door frame I, the panel 7, and the coupling frame II are all of the same width or depth from the outer to the inner surface corresponding to the thickness of the wall of the car body surrounding the door opening 2.

The coupling frame II is hinged at 12 to swing with the panel 7 independently of the door frame I as shown in Figs. 3 and 5, or the door frame I may be swung with the coupling frame II and the panel 7. By this arrangement the door frame I with the panel 7 and coupling frame II fitted therein may be moved as an entirety about the hinges 6. When, however, it is desired to provide additional space in line with and adjacent to the transversely extending seat of the car when the door frame I is held in closed position, the panel 7 and the coupling frame II may be swung independently of the door frame I about their respective hinges 10 and 12 to position their free edges beyond the plane of the door frame I and the body of the car and thus provide the additional transverse space required to comfortably accommodate more than two persons in the front seat which usually overlaps the door opening at each end in the manner shown in Fig. 3 of the drawing, as will be hereinafter pointed out.

The main door frame I, the panel 7, and the coupling frame II along the vertical free edges opposite the hinges and about the upper edge are provided with mating channels 13 and flanges 14 (see Figs. 2, 3, 4, and 5) whereby to limit the relative movement and at the same time maintain a weatherproof coupling when in the position shown in Figs. 3 and 5 with the panel 7 extended. The panel 7 is of the same width transversely as the frames I and II and when closed as shown in Fig. 4 provides a door thickness commensurate with that of the body of the car.

The frame I is provided with the usual latching device 15 operated by a knob or handle 16 upon the outer side. The coupling frame II is held in closed position by latches 17 and 18 operated by shaft 19 having upon its inner end a knob 20 which also operates the latch 15 from the inside of the car.

The panel 7 is provided with a latch 21 which in open position engages the flange 14 near the outer edge of the coupling frame 11 and when closed engages an opening in the web of the frame 11 (see Figs. 4 and 5). The latch 21 is operated by a shaft 22 which upon its inner end carries a knob or handle 23. When the parts are closed as shown in Fig. 4, the operating knobs or handles 20 and 23 are readily accessible upon the inner surface of the door.

In the form shown in Fig. 6, the construction is substantially the same with the exception that the frame section 1 is hinged at the opposite edge of the door opening as indicated at 29 and 30. The coupling frame 11 and the panel 7 are hinged at the forward edge by the hinges 10 and 12 as hereinbefore described. The flanged and rabbeted construction about the meeting edges other than the free edges may be as indicated at 24 and 25 in Fig. 2, the construction shown at 25 extending along the straight portion of the top, the arrangement being such that a weatherproof closure will be provided excluding dust and rain without restricting the swinging movement, such swinging movement being limited by the construction along the free edge only.

As indicated in Fig. 3, the hinged edges of the frames 1 and 11 and the panel 7 have overlapping rabbeted contacts with each other along the inner edges which will not interfere with the free swinging movement thereof. The panel 7 may be provided with a sliding glass window or supplementary panel 26 mounted to slide up and down in the usual manner.

As indicated in Fig. 3, the door opening in the body of the automobile is at the opposite ends of the seat 27 which partially overlaps said openings, the back of the seat being indicated at 28. Should additional space extending transversely between the doors at opposite sides of the car be required when they are closed, it is readily provided by releasing the panel 7 and coupling frame 11 and swinging them about their pivots 10 and 12 to the position indicated in Figs. 3 and 5 of the drawing.

It is thought that the operation of the device has been sufficiently described in connection with the foregoing description of its construction and that any further description of the operation will be unnecessary.

The device is made of any suitable material preferably pressed steel which is now so generally used in the construction of automobile bodies.

I claim:

1. An expansible door for the door opening of an automobile, comprising a substantially rectangular door frame hingedly connected along one of its vertical edges to the automobile so as to swing into and out of said door opening, said door frame being of a size to fit said door opening, a rectangular coupling frame of the same shape as said door frame and of a size to fit therein, said coupling frame being hingedly connected along one vertical edge to said door frame and independently swingable into and out of said door frame, a rectangular panel of the same shape as said coupling frame hingedly secured along one of its vertical edges to said coupling frame, said panel being of a size to fit into said coupling frame and be independently swingable into and out of said frame, said door frame, said coupling frame and said panel being nestable in the same plane in said door opening, said door frame, coupling frame and panel being formed with loosely interlocking channel and flange connections to limit the outward swinging movement of said coupling frame and panel independent of said door frame.

2. An expansible door for automobiles provided with a door opening, comprising a door frame substantially of the same shape as the door opening, said door frame being hingedly mounted on said automobile and swingable into and out of said door opening, a panel hinged at one edge to said door frame for independent movement into and out of the door frame and a hinged coupling frame substantially of the same shape as said panel interposed between the door frame and the panel and movable with said door frame and panel and to a limited extent independently thereof, and means to limit the relative movement of the door frame, coupling frame, and panel, said door frame, coupling frame and panel having coacting edge flanges and guides for limiting independent movement of the respective frames and panel.

DAVID LEVINSON.